United States Patent
Chen

(10) Patent No.: US 10,228,596 B2
(45) Date of Patent: Mar. 12, 2019

(54) SUBSTRATE, DISPLAY PANEL AND DISPLAY APPARATUS

(71) Applicants: HKC Corporation Limited, Shenzhen (CN); Chongqing HKC Optoelectronics Technology Co., ltd., Chongqing (CN)

(72) Inventor: Yu-Jen Chen, Chongqing (CN)

(73) Assignees: HKC CORPORATION LIMITED, Shenzhen (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 0 days.

(21) Appl. No.: 15/846,573

(22) Filed: Dec. 19, 2017

(65) Prior Publication Data

US 2018/0259821 A1   Sep. 13, 2018

Related U.S. Application Data

(63) Continuation of application No. PCT/CN2017/116147, filed on Dec. 14, 2017.

(30) Foreign Application Priority Data

Mar. 10, 2017   (CN) .......................... 2017 1 0144383

(51) Int. Cl.
| | | |
|---|---|---|
| *G02F 1/1345* | (2006.01) | |
| *G02F 1/1362* | (2006.01) | |
| *G02F 1/1335* | (2006.01) | |
| *G02F 1/1368* | (2006.01) | |
| *G02F 1/1337* | (2006.01) | |
| *G02F 1/1343* | (2006.01) | |

(52) U.S. Cl.
CPC ...... *G02F 1/136286* (2013.01); *G02F 1/1337* (2013.01); *G02F 1/1368* (2013.01); *G02F 1/133514* (2013.01); *G02F 1/133528* (2013.01); *G02F 1/134309* (2013.01)

(58) Field of Classification Search
CPC ............... G02F 1/1345; G02F 1/13452; G02F 1/136286; G02F 1/134309; G02F 1/1335; G02F 1/1336; G02F 1/133514; G02F 1/13458; G02F 1/133528; G02F 1/133615; G02F 1/1337; G02F 1/1362; G02F 1/1368; G09G 2300/0426; G09G 2310/0281; G09G 2310/0232; G09G 2310/0278; G09G 3/2092; H01L 27/3276; H01L 27/3279; H01L 23/5386; H01L 24/50; H01L 2924/14; H05K 1/025; H05K 2201/09227; H05K 2201/10136
See application file for complete search history.

(56) References Cited

U.S. PATENT DOCUMENTS

2016/0063912 A1 * 3/2016 Zhang .................. H01L 27/124
                                                                345/212

* cited by examiner

*Primary Examiner* — Thoi V Duong
(74) *Attorney, Agent, or Firm* — WPAT, PC

(57) ABSTRACT

A substrate, a display panel and a display apparatus are provided. The substrate is provided with a fan-out area. The fan-out area includes a middle region and side regions. The middle region has first metal wires arranged therein. The side regions have second metal wires arranged thereon. Lengths of the second metal wires in the side regions are greater than lengths of the first metal wires in the middle region, and impedances of the first metal wires in the middle region are higher than impedances of the second metal wires in the side regions.

20 Claims, 2 Drawing Sheets

SUBSTRATE, DISPLAY PANEL AND DISPLAY APPARATUS

FIELD OF THE DISCLOSURE

The disclosure relates to the field of display technology, and more particularly to a substrate, a display panel and a display apparatus.

BACKGROUND

With the development of display technology, liquid crystal displays have become the most common display apparatuses. In the liquid crystal display, pixels are controlled by crisscrossed gate lines and data lines on the array substrate, so as to realize a display of image. Gate driving signals and data signals are issued from control chips in the liquid crystal display, and the gate driving signals and the data signals are usually transmitted to the gate lines and the data lines on the array substrate through chip on films (COFs). The COFs are connected to the gate lines or the data lines in a display area through fan-out wires in a fan-out area. One group of fan-out wires includes a plurality of wires, since the fan-out wires as a whole are fan-shaped, lengths of the wires at left and right sides of the group of fan-out wires are greater than lengths of the wires in the middle of the group of fan-out wires, so that resistances of the two sided wires are greater than resistances of the middle wires, which would result in waveforms of transmitted gate driving signals or data signals are seriously distorted and affects the uniformity of signals.

At present, most of existing solutions are to make the middle wires be meandered, so that lengths of the two sided wires in the fan-out area are closer to that of the middle wires, and correspondingly the resistances of the two sided wires in the fan-out area are also closer to the middle wires, and thereby the uniformity of signals is improved consequently. However, if the wires are set to be meandered, the wires will take up more space, and a width of a border area of the liquid crystal display thus is increased, which is difficult to meet the current demand for narrow-border products. Therefore, it is unsatisfactory to only change the shapes of the wires to make the resistances of the two sided wires equal to that of the middle wires, and thus there is a need of improving the design of wires on the array substrate.

SUMMARY

Therefore, technical problems to be solved in the disclosure are to provide a substrate, a display panel and a display apparatus, so as to address the issue that the resistances of the two sided wires in the fan-out area of the substrate being greater than the resistances of the middle wires would seriously distort the waveforms of signals and consequently affect the signal uniformity.

An embodiment of the disclosure is implemented as that: a substrate is provided with a fan-out area and the fan-out area includes: a middle region, wherein several first metal wires are arranged in the middle region; and side regions, wherein several second metal wires are arranged in the side regions, and the side regions are respectively located at two sides of the middle region. Lengths of the second metal wires in the side regions are greater than lengths of the first metal wires in the middle region. Impedances of the first metal wires in the middle region are higher than impedances of the second metal wires in the side regions. For the second metal wires in the side regions, the closer the second metal wire to the middle region, the shorter the length is and the higher the impedance is; and for the first metal wires in the middle region, the closer the first metal wire to a center position of the middle region, the shorter the length is and the higher the impedance is.

In one embodiment, the first metal wires in the middle region are meandered.

In one embodiment, the second metal wires in the side regions are meandered.

In one embodiment, the first metal wires and/or the second metal wires are an electrically conductive layer deposited onto the substrate, or the first metal wires and/or the second metal wires are electrically conductive wires fixedly connected onto the substrate.

In order to solve the above technical problems, another embodiment of the disclosure provides a display panel including: a substrate, a color filter substrate, a liquid crystal layer, a first polarizer and a second polarizer. The substrate is an array substrate, a first electrode layer equipped with transistors and a first alignment layer covering the first electrode layer are disposed at an inner side of the array substrate, and a display area and a border area are disposed on the first electrode layer. A second electrode layer and a second alignment layer covering the second electrode layer are disposed at an inner side of the color filter substrate, and the liquid crystal layer is disposed between the first alignment layer and the second alignment layer. The first polarizer is disposed at an outer side of the array substrate, and the second polarizer is disposed at an outer side of the color filter substrate. A fan-out area is disposed in the border area and includes: a middle region, wherein a plurality of first metal wires are arranged in the middle region; and side regions, wherein a plurality of second metal wires are arranged in the side regions, and the side regions are respectively located at two sides of the middle region. Lengths of the second metal wires in the side regions are greater than lengths of the first metal wires in the middle region; and impedances of the first metal wires in the middle region are higher than impedances of the second metal wires in the side regions.

In one embodiment, for the second metal wires in the side regions, the closer the second metal wire to the middle region, the shorter the length is and the higher the impedance is.

In one embodiment, for the first metal wires in the middle region, the closer the first metal wire to a center position of the middle region, the shorter the length is and the higher the impedance is.

In one embodiment, the first metal wires in the middle region are meandered.

In one embodiment, the second metal wires in the side regions are meandered.

In one embodiment, the first metal wires and/or the second metal wires are an electrically conductive layer deposited onto the substrate or electrically conductive wires fixedly connected onto the substrate.

In one embodiment, the display panel is a liquid crystal panel, a semiconductor light emitting diode display panel or an organic light emitting diode display panel.

Still another embodiment of the disclosure provides a display apparatus including a backlight module. The display apparatus has a display panel and the display panel includes a substrate, a color filter substrate, a liquid crystal layer, a first polarizer and a second polarizer. The substrate is an array substrate, a first electrode layer equipped with transistors and a first alignment layer covering the first electrode layer are disposed at an inner side of the array substrate, and a display area and a border area are disposed on the first electrode layer. A second electrode layer and a second alignment layer covering the second electrode layer are disposed at an inner side of the color filter substrate, and the liquid crystal layer is disposed between the first alignment layer and the second alignment layer. The first polarizer is disposed at an outer side of the array substrate, and the second polarizer is disposed at an outer side of the color filter substrate. A fan-out area is disposed in the border area and includes: a middle region, wherein a plurality of first metal wires are arranged in the middle region; and side regions, wherein a plurality of second metal wires are arranged in the side regions, and the side regions are respectively located at two sides of the middle region. Lengths of the second metal wires in the side regions are greater than lengths of the first metal wires in the middle region; and impedances of the first metal wires in the middle region are higher than impedances of the second metal wires in the side regions.

In one embodiment, for the second metal wires in the side regions, the closer the second metal wire to the middle region, the shorter the length is and the higher the impedance is.

In one embodiment, for the first metal wires in the middle region, the closer the first metal wire to a center position of the middle region, the shorter the length is and the higher the impedance is.

In one embodiment, the first metal wires in the middle region are meandered.

In one embodiment, the second metal wires in the side regions are meandered.

In one embodiment, the first metal wires and/or the second metal wires are an electrically conductive layer deposited onto the substrate or electrically conductive wires fixedly connected onto the substrate.

In one embodiment, the display panel is a liquid crystal panel, a semiconductor light emitting diode display panel or an organic light emitting diode display panel.

For the substrate of the embodiments of the disclosure, metal wire-like materials used by the first metal wires in the middle region of the fan-out area have impedances higher than that of the metal wire-like materials used by the second metal wires in the side regions, which can make the first metal wires in the middle region and the second metal wires in the side regions have equal resistances or reduced resistance difference. Therefore, waveform distortions of gate driving signals or data signals transmitted by the metal wires can be prevented, and the uniformity of signals is ensured consequently.

BRIEF DESCRIPTION OF THE DRAWINGS

One or more embodiments will be exemplarily described with reference to accompanying drawings, these exemplary description are not to be construed as limiting the embodiments. Elements with a same reference numeral in the drawings are represented as similar elements, unless otherwise expressly stated, the drawings should not be given a scaling restriction.

DETAILED DESCRIPTION OF EMBODIMENTS

In order to make the technical problems to be solved, technical solutions and beneficial effects of the disclosure be more clearly, the disclosure will be described in detail below by specific embodiments in conjunction with accompanying drawings. It should be understood that, the specific embodiments described herein are merely illustrative of the disclosure and are not intended to limit the scope of the disclosure.

Figure 1:
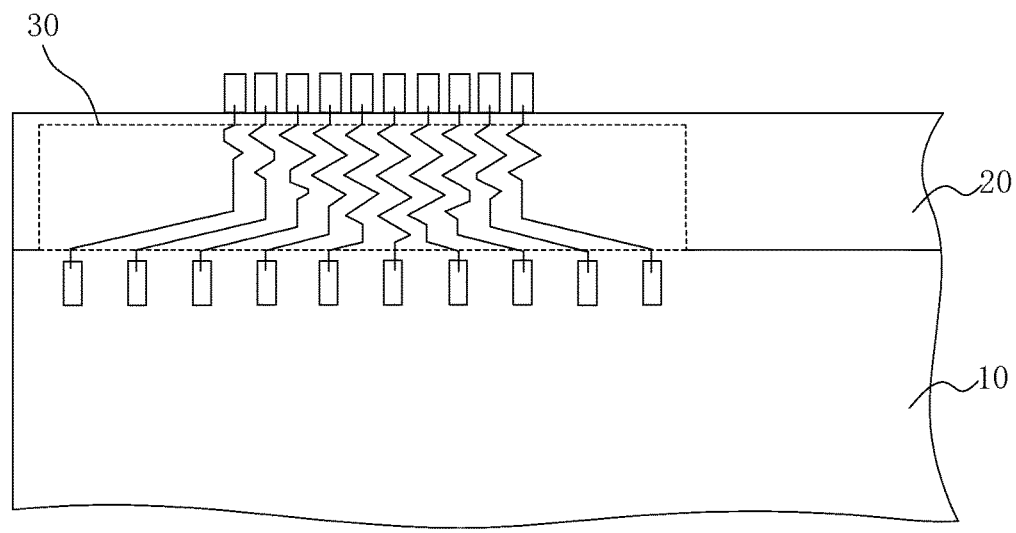
FIG. 1 is a schematic view of metal wires in a fan-out area of a substrate according to an embodiment of the disclosure.
Figure 2:
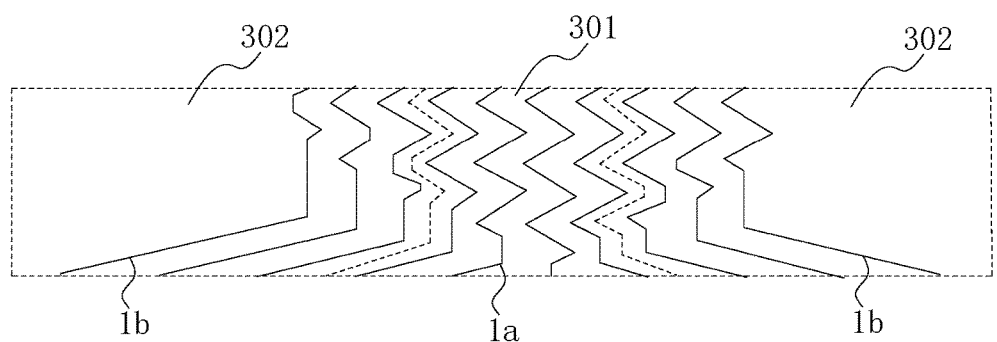
FIG. 2 is a schematic enlarged view of the fan-out area in FIG. 1.

Referring to FIG. 1 and FIG. 2, an embodiment of the disclosure provides a substrate 100. The substrate 100 has a display area 10 and a border area 20 (also referred to as non-display area or peripheral area) disposed thereon, and several fan-out areas 30 (FIG. 1 only show on fan-out area 30 for the purpose of illustration) are disposed in the border area 20.

The substrate 100 can be applied for various display panels such as a liquid crystal panel, a semiconductor light emitting diode display panel, an organic light emitting diode display panel and so on.

More specifically, the fan-out area 30 includes a middle region 301 and side regions 302. The side regions 302 are respectively located at two sides of the middle region 301. The middle region 301 has several first metal wires 1a disposed therein, and the side regions 302 have several second metal wires 1b disposed therein. Lengths of the second metal wires 1b in the side regions 302 are greater than lengths of the first metal wires 1a in the middle region 301, and impedances (e.g., resistance per unit length) of the first metal wires 1a in the middle region 301 are higher than impedances of the second metal wire 1b in the side regions 302. In order to make the lengths of the first metal wires 1a in the middle region 301 are closer to the lengths of the second metal wires 1b in the side regions 302, in an exemplary embodiment, the first metal wires 1a in the middle region 301 are set to be meandered, and some portions of the second metal wires 1b in the side regions 302 also are set to be meandered.

Figure 3:
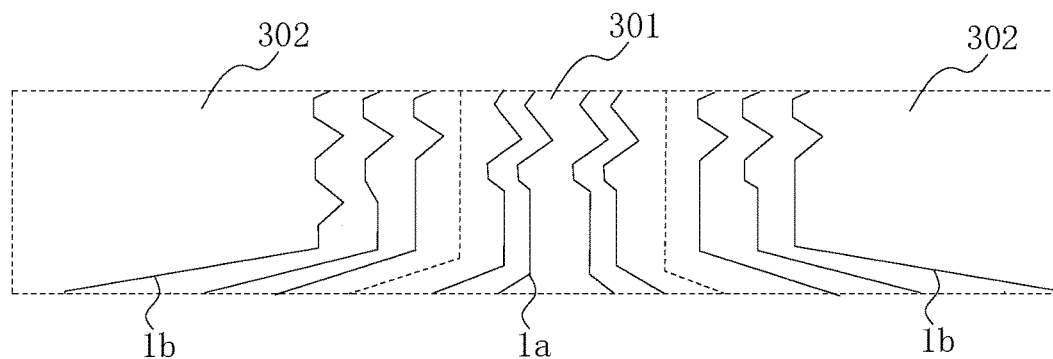
FIG. 3 is a schematic view of metal wires in a fan-out area of a substrate according to another embodiment of the disclosure.

In particular, the lengths of the first metal wires 1a in the middle region 301 may be the same or different from one another. Referring to FIG. 2, all the first metal wires 1a in the middle region 301 have the same length, and all the first metal wires 1a in the middle region 301 may use metal wire-like materials with same impedance. Referring to FIG. 3, as to the first metal wires 1a in the middle region 301, the closer the first metal wire 1a is to a center position of the middle region 302, the shorter the length thereof is and the higher the impedance of the used metal wire-like material is.

Likewise, as to the second metal wires 1b in the side regions 302, the lengths thereof may be different or the same. Referring to FIG. 2 again, the second metal wires 1b in the side regions 302 have the same length, and the second metal wires 1b in the side regions 302 employ metal wire-like materials with same impedance. Referring to FIG. 3 again, as to the second metal wires 1b in the side regions 302, the closer the second metal wire 1b is to the middle region 301, the shorter the length thereof is and the higher the impedance of the used metal wire-like material is.

The first metal wires 1a and the second metal wires 1b are an electrically conductive layer disposed onto the substrate 100, or the first metal wires 1a and the second metal wires 1b are conductive wires fixedly connected onto the substrate 100.

In an exemplary embodiment, a deposition method may be used to arrange the first metal wires 1a and the second metal wires 1b onto a substrate.

Manufacturing steps of the substrate 100 according to an exemplary embodiment are as follows:

glass cleaning, to remove foreign matter;

region dividing, to divide a surface of the glass into the display area 10 and the fan-out area 30, and further divide the fan-out area 30 into the middle region 301 and the side regions 302;

film forming process, e.g., using metal materials with different impedances to form metal films with different impedances on the surface of the cleaned glass by a sputter deposition, the impedance of the metal film in the middle region 301 is higher than the impedance of the metal films in the side regions;

photoresist coating, e.g., evenly coating a layer of photoresist on top surfaces of the formed metal films;

exposure, e.g., UV rays passing through a mask and then illuminating the photoresist on the glass to perform exposure, positions other than through holes on the mask are the display area 10 and wiring positions of the fan-out area 30, lengths of wire-like regions on the mask and corresponding to the first metal wires 1a in the middle region 301 are smaller than lengths of wire-like regions corresponding to the second metal wires 1b in the side regions 302;

developing, e.g., the exposed portions of the photoresist are dissolved by a developer and a part of the photoresist showing a desired pattern is left;

etching, e.g., the substrate 100 is placed into a corresponding etching solution or an etching gas to etch off the films uncovered by the photoresist;

photoresist removing, e.g., removing the residual photoresist and leaving the metal films with the desired pattern, and thereby the substrate 100 is prepared/manufactured as a result.

Regarding the substrate 100 of the illustrated embodiment, the impedance(s) of the metal wire-like materials used by the first metal wires 1a in the middle region 301 of the fan-out area 30 may be higher than the impedance(s) of the metal wire-like materials used by the second metal wires 1b in the side regions 302, which can make the first metal wires 1a in the middle region 301 and the second metal wires 1b in the side regions 302 have the same resistance or reduced resistance difference, so that waveform distortions of the transmitted gate driving signals or data signals through the metal wires can be relieved and the uniformity of signals is ensured.

In the following, the illustrated embodiment uses a liquid crystal panel as an example to describe an embodiment of the above mentioned substrate 100 in detail.

Figure 4:
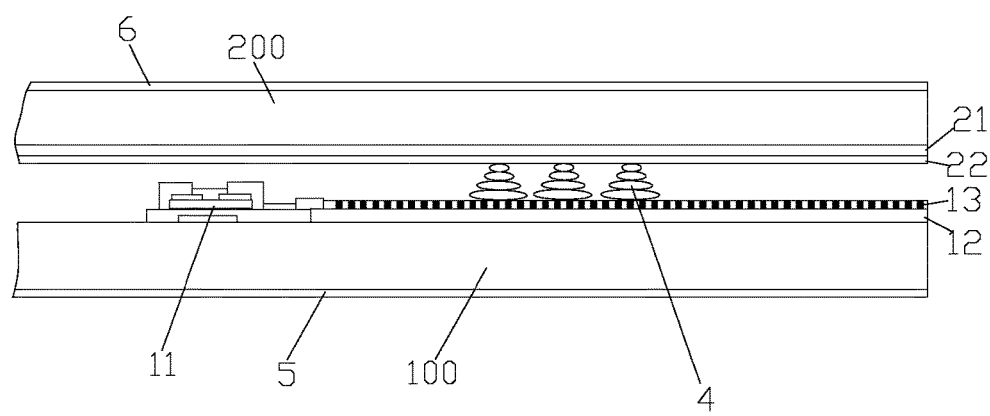
FIG. 4 is a schematic view of a liquid crystal panel according to an embodiment of the disclosure.

Referring to FIG. 4, the liquid crystal panel provided by an exemplary embodiment includes: the substrate 100, a color filter substrate 200, a liquid crystal layer 4, a first polarizer 5 and a second polarizer 6. The substrate 100 is an array substrate. The inner side of the substrate 100 is provided with a first electrode layer 12 equipped with transistors 11 and a first alignment layer 13 covering the first electrode layer 12. The display area 10 and the border area 20 are disposed on the first electrode layer 12 of the substrate 100. The border area 20 has several fan-out areas 30 disposed therein. The inner side of the color filter substrate 200 is disposed with a second electrode layer 21 and a second alignment layer 22 covering the second electrode layer 21. The liquid crystal layer 4 is disposed between the first alignment layer 13 and the second alignment layer 22. The first polarizer 5 is disposed at the outer side of the substrate 100, and the second polarizer 6 is disposed at the outer side of the color filter substrate 200.

Figure 5:
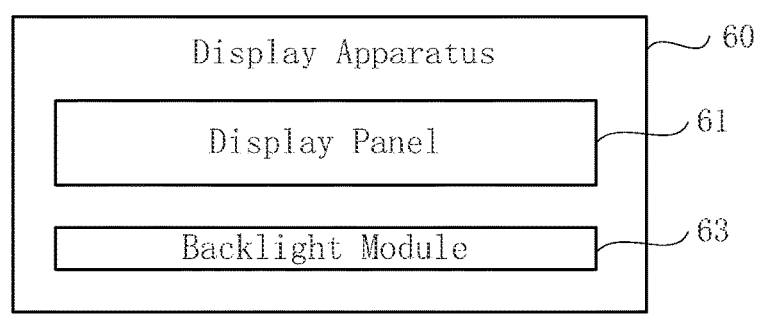
FIG. 5 is a schematic view of a display apparatus according to an embodiment of the disclosure.

Referring to FIG. 5, an embodiment of the disclosure provides a display apparatus 60 including a display panel 61 and a backlight module 63. The display panel 61 has the above described substrate 100. It should be understood that, the display panel 61 may be a liquid crystal panel, a semiconductor light emitting diode display panel or an organic light emitting diode display panel.

In the various embodiments provided by the disclosure, it should be understood that the described systems, devices and/or methods can be realized in other ways. For example, the embodiments of devices described above are merely illustrative. For example, division of units is only a logical functional division, and other division manner may be adopted in actual implementation, for example multiple units or components can be combined together or integrated into another system, or some features can be omitted or not implemented. In addition, the coupling or direct coupling or communication connection shown or discussed may be regarded as indirect coupling or communication connection through some interfaces, devices or units, which may be electrical, mechanical or otherwise.

The units described as separation parts may or may not be physically separated, and the parts shown as units may or may not be physical units, i.e., may be located in one place or distributed over multiple network units. Some or all of the units can be selected according to actual needs to achieve the purpose of the embodiments of the disclosure.

Finally, it should be noted that the above embodiments are merely illustrative of technical solutions of the disclosure and are not intended to be limiting thereof. Although the disclosure is described in detail with reference to the foregoing embodiments, a person skilled in the art should be understood that the technical solutions described in the foregoing embodiments can be modified or some of technical features can be equivalently replaced, and these modifications or replacements do not depart from the spirit and scope of the technical solutions of various embodiments of the disclosure.

What is claimed is:

1. A substrate provided with a fan-out area, wherein the fan-out area comprises:
    a middle region, wherein a plurality of first metal wires are arranged in the middle region; and
    side regions, wherein a plurality of second metal wires are arranged in the side regions, and the side regions are located at two sides of the middle region;
    wherein lengths of the second metal wires in the side regions are greater than lengths of the first metal wires in the middle region;
    wherein impedances of the first metal wires in the middle region are higher than impedances of the second metal wires in the side regions;
    wherein, for the second metal wires in the side regions, the closer the second metal wire to the middle region, the shorter the length is and the higher the impedance is;
    wherein, for the first metal wires in the middle region, the closer the first metal wire to a center position of the middle region, the shorter the length is and the higher the impedance is.

2. The substrate as claimed in claim 1, wherein the first metal wires in the middle region are meandered.

3. The substrate as claimed in claim 1, wherein the second metal wires in the side regions are meandered.

4. The substrate as claimed in claim 1, wherein the first metal wires and/or the second metal wires are an electrically conductive layer deposited onto the substrate.

5. The substrate as claimed in claim 1, wherein the first metal wires and/or the second metal wires are electrically conductive wires fixedly connected onto the substrate.

6. A display panel comprising a substrate, a color filter substrate, a liquid crystal layer, a first polarizer and a second polarizer; wherein the substrate is an array substrate, a first electrode layer equipped with transistors and a first alignment layer covering the first electrode layer are disposed at an inner side of the array substrate, and a display area and a border area are disposed on the first electrode layer;
 wherein a second electrode layer and a second alignment layer covering the second electrode layer are disposed at an inner side of the color filter substrate, and the liquid crystal layer is disposed between the first alignment layer and the second alignment layer;
 wherein the first polarizer is disposed at an outer side of the array substrate, and the second polarizer is disposed at an outer side of the color filter substrate;
 wherein a fan-out area is disposed in the border area and comprises:
 a middle region, wherein a plurality of first metal wires are arranged in the middle region;
 side regions, wherein a plurality of second metal wires are arranged in the side regions, and the side regions are respectively located at two sides of the middle region;
 wherein lengths of the second metal wires in the side regions are greater than lengths of the first metal wires in the middle region;
 wherein impedances of the first metal wires in the middle region are higher than impedances of the second metal wires in the side regions.

7. The display panel as claimed in claim 6, wherein for the second metal wires in the side regions, the closer the second metal wire to the middle region, the shorter the length is and the higher the impedance is.

8. The display panel as claimed in claim 7, wherein for the first metal wires in the middle region, the closer the first metal wire to a center position of the middle region, the shorter the length is and the higher the impedance is.

9. The display panel as claimed in claim 6, wherein for the first metal wires in the middle region, the closer the first metal wire to a center position of the middle region, the shorter the length is and the higher the impedance is.

10. The display panel as claimed in claim 6, wherein the first metal wires in the middle region are meandered.

11. The display panel as claimed in claim 6, wherein the second metal wires in the side regions are meandered.

12. The display panel as claimed in claim 6, wherein the first metal wires and/or the second metal wires are an electrically conductive layer deposited onto the substrate or electrically conductive wires fixedly connected onto the substrate.

13. The display panel as claimed in claim 6, wherein the display panel is a liquid crystal panel, a semiconductor light emitting diode display panel or an organic light emitting diode display panel.

14. A display apparatus comprising a backlight module; wherein the display apparatus has a display panel, the display panel comprises a substrate, a color filter substrate, a liquid crystal layer, a first polarizer and a second polarizer; the substrate is an array substrate, a first electrode layer equipped with transistors and a first alignment layer covering the first electrode layer are disposed at an inner side of the array substrate, and a display area and a border area are disposed on the first electrode layer;
 wherein a second electrode layer and a second alignment layer covering the second electrode layer are disposed at an inner side of the color filter substrate, and the liquid crystal layer is disposed between the first alignment layer and the second alignment layer;
 wherein the first polarizer is disposed at an outer side of the array substrate, and the second polarizer is disposed at an outer side of the color filter substrate;
 wherein a fan-out area is disposed in the border area and comprises:
 a middle region, wherein a plurality of first metal wires are arranged in the middle region;
 side regions, wherein a plurality of second metal wires are arranged in the side regions, and the side regions are respectively located at two sides of the middle region;
 wherein lengths of the second metal wires in the side regions are greater than lengths of the first metal wires in the middle region;
 wherein impedances of the first metal wires in the middle region are higher than impedances of the second metal wires in the side regions.

15. The display apparatus as claimed in claim 14, wherein for the second metal wires in the side regions, the closer the second metal wire to the middle region, the shorter the length is and the higher the impedance is.

16. The display apparatus as claimed in claim 14, wherein for the first metal wires in the middle region, the closer the first metal wire to a center position of the middle region, the shorter the length is and the higher the impedance is.

17. The display apparatus as claimed in claim 14, wherein the first metal wires in the middle region are meandered.

18. The display apparatus as claimed in claim 14, wherein the second metal wires in the side regions are meandered.

19. The display apparatus as claimed in claim 14, wherein the first metal wires and/or the second metal wires are an electrically conductive layer deposited onto the substrate or electrically conductive wires fixedly connected onto the substrate.

20. The display apparatus as claimed in claim 14, wherein the display panel is a liquid crystal panel, a semiconductor light emitting diode display panel or an organic light emitting diode display panel.

* * * * *